US011073109B2

(12) United States Patent
Moss et al.

(10) Patent No.: US 11,073,109 B2
(45) Date of Patent: Jul. 27, 2021

(54) GAS TURBINE ENGINE

(71) Applicant: ROLLS-ROYCE plc, London (GB)

(72) Inventors: Stuart Moss, Loughborough (GB); Douglas M M Herbert, Derby (GB)

(73) Assignee: ROLLS-ROYCE plc, London (GB)

( * ) Notice: Subject to any disclaimer, the term of this patent is extended or adjusted under 35 U.S.C. 154(b) by 152 days.

(21) Appl. No.: 16/569,987

(22) Filed: Sep. 13, 2019

(65) Prior Publication Data

US 2020/0102914 A1    Apr. 2, 2020

(30) Foreign Application Priority Data

Oct. 1, 2018   (GB) ..................................... 1816024

(51) Int. Cl.
| | |
|---|---|
| *F02K 3/075* | (2006.01) |
| *F02C 3/113* | (2006.01) |
| *F02C 7/32* | (2006.01) |

(52) U.S. Cl.
CPC .............. *F02K 3/075* (2013.01); *F02C 3/113* (2013.01); *F02C 7/32* (2013.01); *F05D 2220/36* (2013.01); *F05D 2220/76* (2013.01); *F05D 2270/304* (2013.01); *F05D 2300/507* (2013.01)

(58) Field of Classification Search
CPC .. F02K 3/075; F02C 3/113; F02C 6/14; F02C 7/32; F02C 7/36; F05D 2220/32; F05D 2220/3216; F05D 2220/36; F05D 2220/76; F05D 2220/768; F05D 2270/304; F05D 2300/507; F05D 2240/24; F05D 2260/42; F01D 15/10; Y02T 50/60
See application file for complete search history.

(56) References Cited

U.S. PATENT DOCUMENTS

| | | | |
|---|---|---|---|
| 9,325,388 B2* | 4/2016 | Bevly, III | ............... F01D 17/02 |
| 2007/0289310 A1* | 12/2007 | Dooley | ...................... F02C 7/06 |
| | | | 60/773 |
| 2009/0120100 A1* | 5/2009 | Merry | ...................... F01D 15/10 |
| | | | 60/788 |
| 2013/0052021 A1* | 2/2013 | Hayford | .................... F01D 5/26 |
| | | | 416/203 |
| 2016/0096632 A1 | 4/2016 | Veilleux, Jr. et al. | |
| 2017/0062886 A1* | 3/2017 | Bollman | ............. H01M 10/663 |
| 2018/0003109 A1 | 1/2018 | Lents et al. | |

FOREIGN PATENT DOCUMENTS

| | | |
|---|---|---|
| GB | 2531429 | 4/2016 |
| WO | WO 2006/060014 A1 | 6/2006 |
| WO | 2010067172 | 6/2010 |

OTHER PUBLICATIONS

Extended European Search Report, issued in EP Application No. 19196505.2, dated Apr. 8, 2020, pp. 1-4, European Patent Office, Munich, Germany.
Great Britain search report dated Mar. 20, 2019, issued in GB Patent Application No. 1816024.2.

* cited by examiner

*Primary Examiner* — Jesse S Bogue
*Assistant Examiner* — Loren C Edwards
(74) *Attorney, Agent, or Firm* — Brinks Gilson & Lione

(57) ABSTRACT

A gas turbine engine comprises a compressor having a plurality of blades mounted to a hollow, annular compressor drum. The compressor comprises an electric storage device mounted within the hollow compressor drum.

19 Claims, 9 Drawing Sheets

GAS TURBINE ENGINE

CROSS-REFERENCE TO RELATED APPLICATIONS

This application is based upon and claims the benefit of priority from British Patent Application No. GB 1816024.2, filed on 1 Oct. 2018, the entire contents of which are incorporated by reference.

BACKGROUND

Technical Field

The present disclosure concerns a gas turbine engine having an embedded capacitor.

Description of the Related Art

According to a first aspect there is provided a gas turbine engine comprising a compressor, the compressor comprising a plurality of blades mounted to a hollow, annular compressor drum, wherein the compressor comprises an electric storage device mounted within the hollow compressor drum.

SUMMARY

The inventors have found that the hollow compressor drum of a gas turbine engine provides a volume in which an electric storage device can be installed, which can provide for various advantages. Various further optional features and associated advantages may be provided, as set out below.

The electric storage device may comprise one or more of a chemical battery, a fuel cell, and a capacitor.

The gas turbine engine may comprise an electric machine coupled to one or more compressors of the gas turbine engine. The electric machine may be electrically coupled to the electric storage device. Advantageously, the electric storage device may be used to power a gas turbine engine electric machine when the electric machine is used as a motor, and may be used to store electric power generated by the electric machine when the electric machine is used as a generator.

The compressor may comprise two or more compressor discs joined by a rim provided at a root of the compressor blades, to form the compressor drum. Each compressor disc may comprise a web extending radially inwardly from the rim. One or more electric storage devices may be provided in a toroidal space defined by adjacent webs and the rim.

The compressor may comprise a radially inner spool spaced from the compressor rim. The electric storage device may be mounted to the radially inner spool, and where the electric storage device comprises a capacitor, the capacitor may be wound around the radially inner spool. Advantageously, the weight of the capacitor is borne by the radially inner spool, and may be borne by the webs. Consequently, the relatively thin rim is not burdened by the centrifugal loads generator by the mass of the capacitor, and so a weight efficient structure is provided.

The electric machine may comprise a synchronous electric machine comprising a stator having stator windings, and a rotor comprising rotor windings. The rotor may be mounted to the compressor, and the stator may be mounted to a non-rotating static component. The rotor windings may be electrically coupled to the capacitor. Advantageously, the capacitor provides DC current to the rotor, to energise the rotor windings in use. Such an arrangement provides thereby combines an energy store for the rotor windings, without requiring brushes, excitors or rotating rectifiers in order to provide energy to the rotor from the static components. Consequently, efficiency is increased (as there are no losses associated with the electrical transfer equipment), and weight is reduced, since brushes and/or transformers may be omitted. Furthermore, in view of the increased efficiency, less heat is generated by the system compared to conventional arrangements, and so the cooling system weight is also reduced.

Alternatively, the electric machine may comprise a permanent magnet electrical machine. The permanent magnet electrical machine may comprise permanent magnets mounted to one of the stator and the rotor, with the other of the rotor and the stator comprising electrical windings. Where the electrical windings are mounted to the rotor, the gas turbine engine may comprise one or more power electronics units configured to convert between AC current generated/required by the rotor windings and DC current provided/required by the electric storage device.

The gas turbine engine may comprise a fan located forward of the compressor. The electric machine may be mounted between the fan and the compressor, and may be configured to drive/be driven by the fan. Advantageously, the electric machine may be used to boost the fan for high power conditions, and generate electrical power at low power conditions and on descent. Consequently, the gas turbine engine can be smaller, and can operate closer to its design point for a larger portion of the flight.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
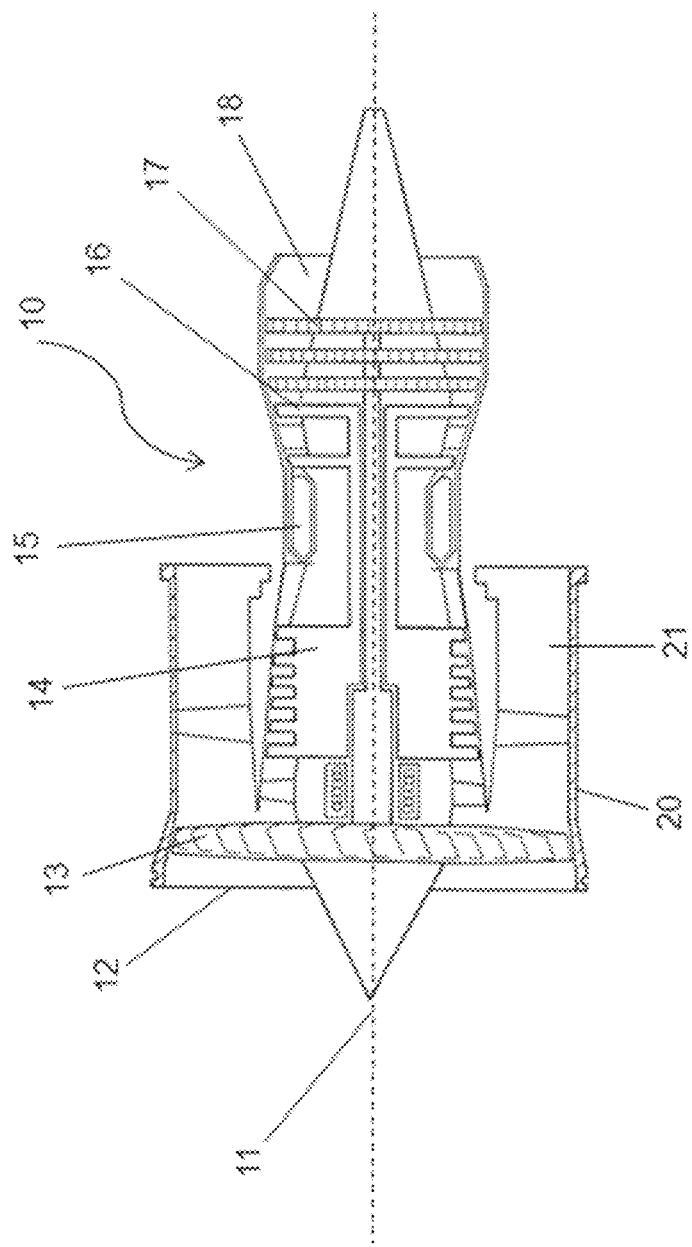
FIG. 1 is a sectional side view of a first gas turbine engine.

With reference to FIG. 1, a gas turbine engine is generally indicated at 10, having a principal and rotational axis 11. The engine 10 comprises, in axial flow series, an air intake 12, a propulsive fan 13, a compressor 14, combustion equipment 15, a high-pressure turbine 16, a low-pressure turbine 17 and an exhaust nozzle 18. A nacelle 20 generally surrounds the engine 10 and defines the intake 12.

The gas turbine engine 10 works in the conventional manner so that air entering the intake 12 is accelerated by the fan 13 to produce two air flows: a first air flow into the compressor 14 and a second air flow which passes through a bypass duct 21 to provide propulsive thrust. The compressor 14 compresses the air flow directed into it before delivering that air to the combustion equipment 15.

In the combustion equipment 15 the air flow is mixed with fuel and the mixture combusted. The resultant hot combustion products then expand through, and thereby drive the high and low-pressure turbines 16, 17 before being exhausted through the nozzle 18 to provide additional propulsive thrust. The high 16 and low 17 pressure turbines drive respectively the compressor 14 and the fan 13, by a compressor shaft 28 and a fan shaft 27 respectively.

Figure 2:
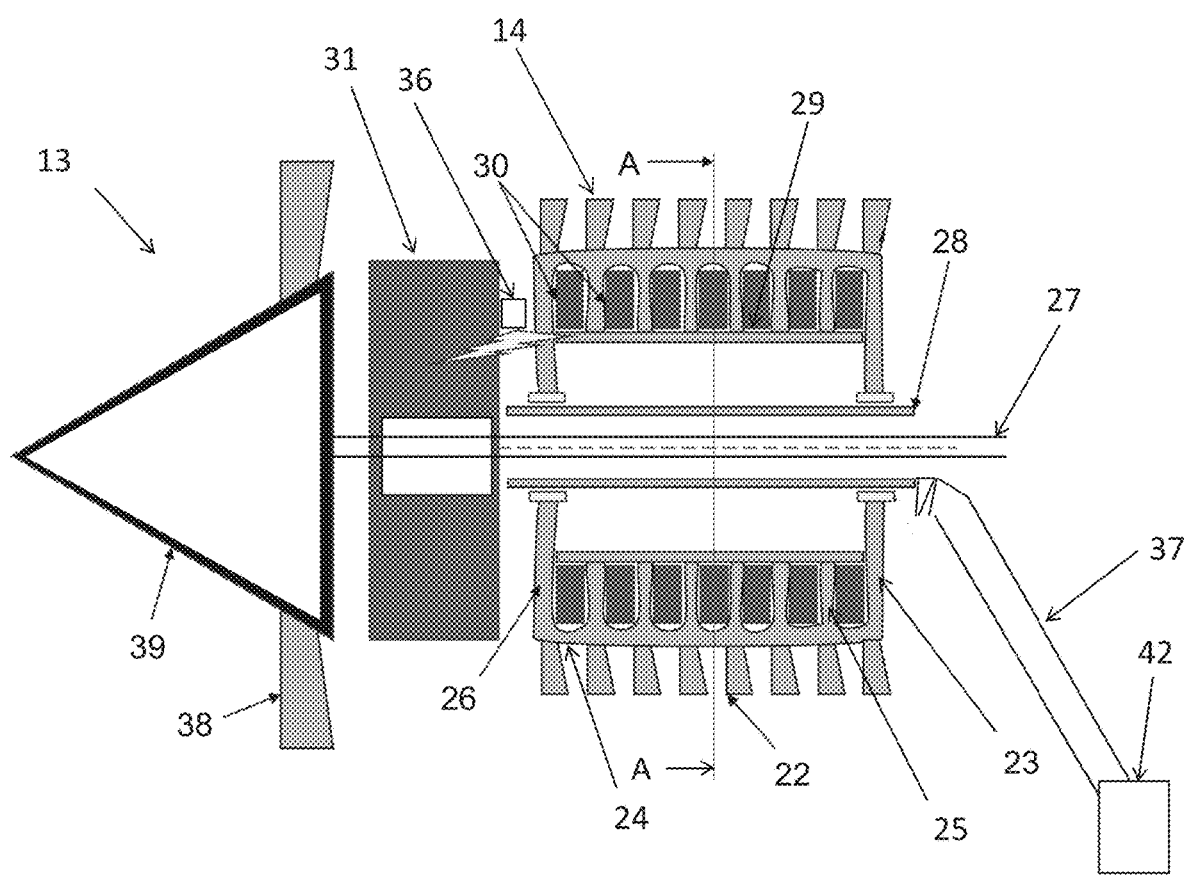
FIG. 2 is a sectional side view of a compressor section of the gas turbine engine of FIG. 1.
Figure 3:
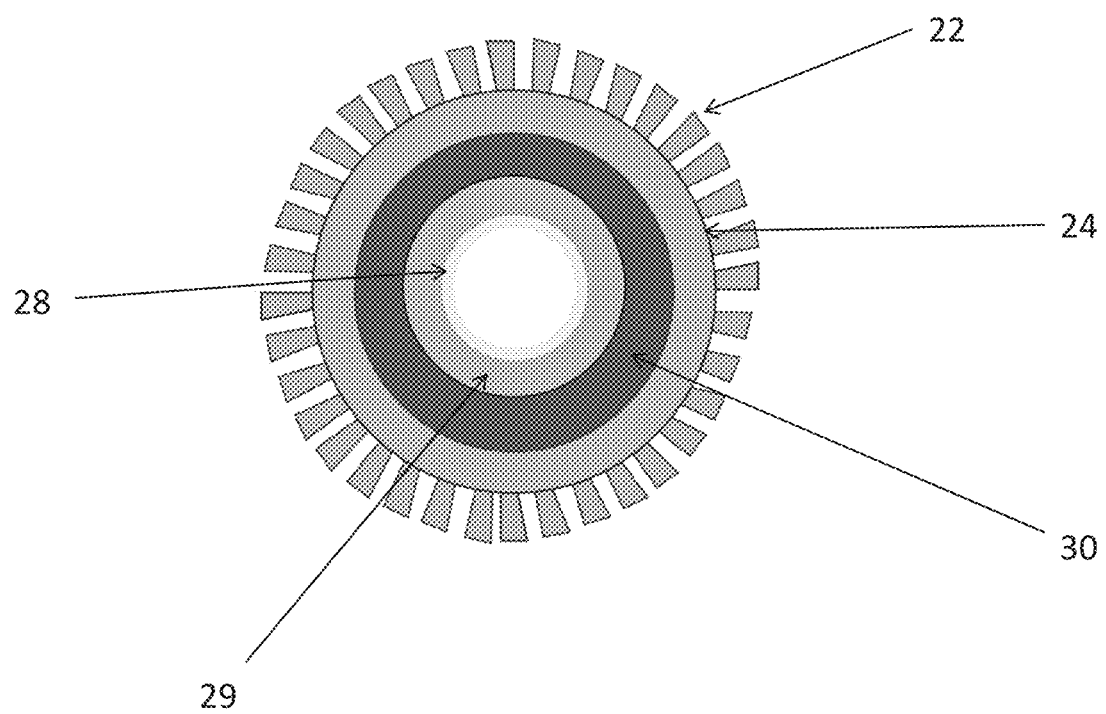
FIG. 3 is a sectional front view of the compressor of FIG. 2.

FIG. 2 shows the low pressure compressor 14 and part of the fan 13 of the gas turbine engine 10 in more detail. The fan 13 comprises a plurality of fan blades 38 mounted to a hub in the form of an inlet spinner 39. The low pressure compressor comprises a plurality of compressor rotor blades 22, which are mounted to a compressor drum 23. The compressor drum comprises a rim 24 provided at a root of each rotor blade 22. The rims 24 are joined together to form an annulus, which extends concentrically around the engine axis 11. The drum 23 further comprises a plurality of compressor discs in the form of webs 25. Each web 25 extends in a generally radial direction, inwardly from the root of each blade 22, radially inwardly of the rim 24. The webs 25 serve to relieve a portion of the hoop stress generated by the blades 22 in flight, and to balance the compressor 14. The drum 23 further comprises forward and rear casings 26, which extend between the rims 24 and the compressor shaft 28. A radially inner spool 29 is provided at a radially inner end of the webs 25. The radially inner spool 29 is generally annular.

The radially inner spool 29, webs 25, rim 24 and casings 26 define a plurality of toroidal spaces therebetween. An electrical storage device in the form of a capacitor 30 is provided within each space.

Each capacitor 30 could be of any suitable type, and may for example comprise a supercapacitor such as an Electrostatic Double-Layer Capacitor (EDLC), an electrochemical pseudocapacitor, or a hybrid capacitor, such as a lithium-ion capacitor.

The supercapacitor may be formed by winding layers of conducting material and electrolyte around the radially inner spool 29. For example, FIG. 9a shows a first supercapacitor 30. The supercapacitor includes a plurality of cells 30a, 30b, 30. Each cell comprises an electrolytic material 44 wound between a pair of electrically conductive current carriers 45. One of the current carriers could comprise the inner spool 29. The current carriers 45 are connected in either series or parallel, to provide either a high current, or a high voltage in use.

Figure 9B:
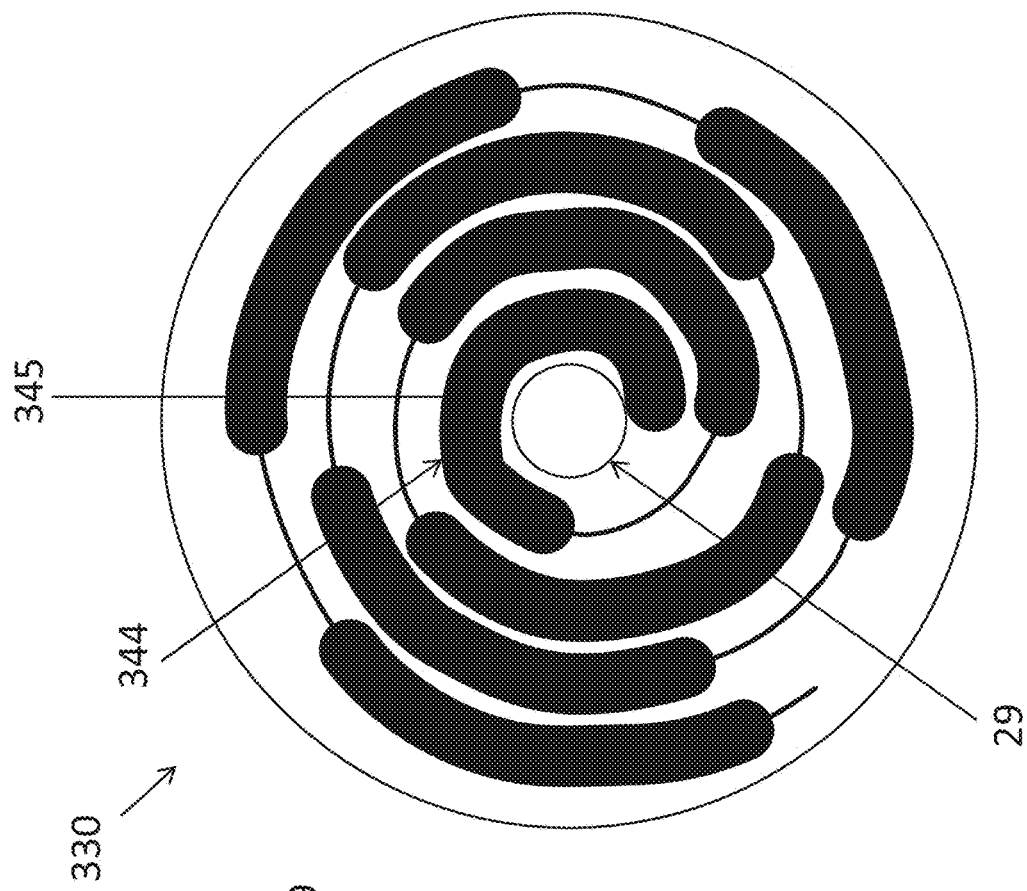
FIGS. 9a and 9b are similar views to FIG. 3, but of an alternative arrangement of electric storage devices.
Figure 9A:
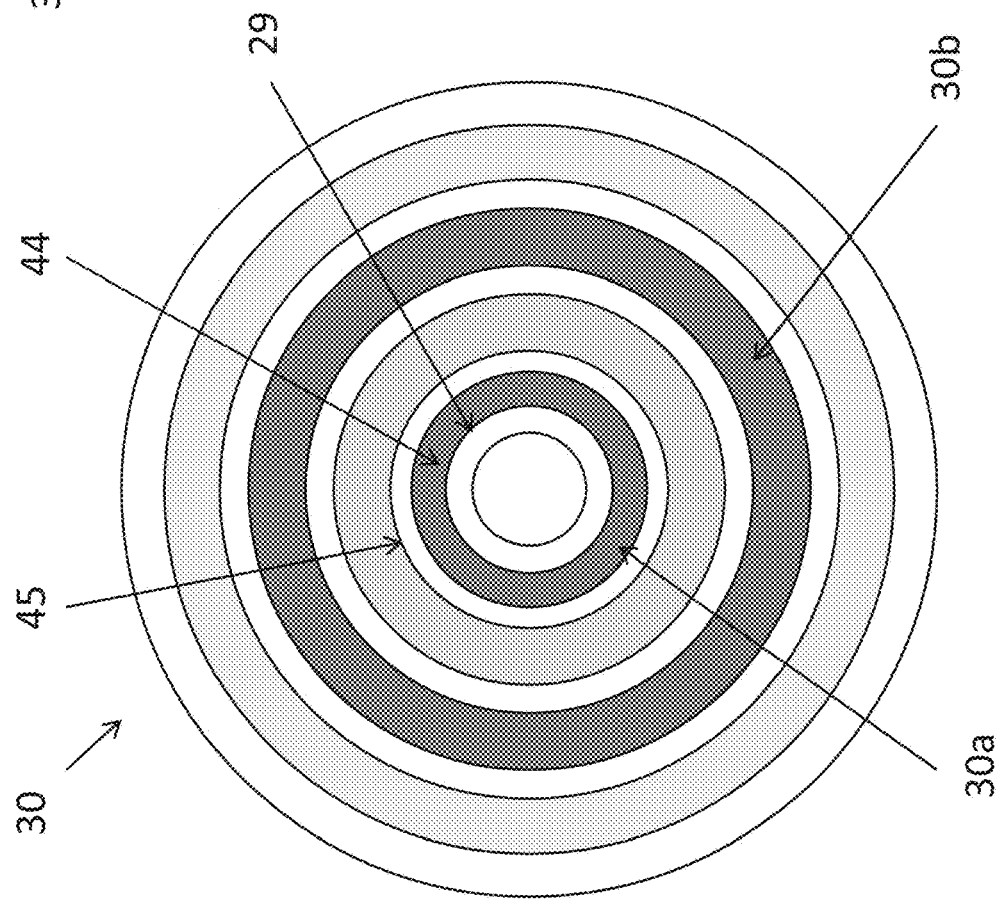

FIG. 9b shows an alternative arrangement of a supercapacitor 330. The supercapacitor 330 comprises a current carrier 345 with an electrolyte material 344 laid thereon. The current carrier and electrolyte material is sound around the radially inner spool 29 to form the supercapacitor 330.

Alternatively, different electrical storage devices could be used. For example, the electrical storage device could comprise a chemical battery, such as a lithium ion battery, or any other suitable chemistry. Similarly, the electrical storage device could comprise a fuel cell, such as a hydrogen fuel cell.

Consequently, a rotating electric storage device in the form of a capacitor 30 is provided within the hollow annular space provided by the compressor drum 23. This provides a number of advantages.

Firstly, the additional inertia provided by the large mass of the capacitor 30 provides resistance against transient stalls by the compressor 14, as increased loads of short duration can be met without decelerating the compressor 14. In other words, the compressor drum 23 and capacitor 30 act as a fly-wheel, thereby increasing compressor 14 stability. Consequently, the compressor 14 may be run closer to the surge line, or increased transient power offtake can be taken, without risking compressor surge. Consequently, the additional mass of the capacitor 30 does not represent "deadweight" when not in use.

Secondly, the rotating capacitor 30 can be used to supply electrical current to electrical devices that need to rotate with the compressor 14 in use.

For example, the gas turbine engine 10 optionally includes an electric machine 31 mounted to the compressor shaft 28. A first example of a suitable electric machine 31 is shown in more detail in FIG. 4.

Figure 4:
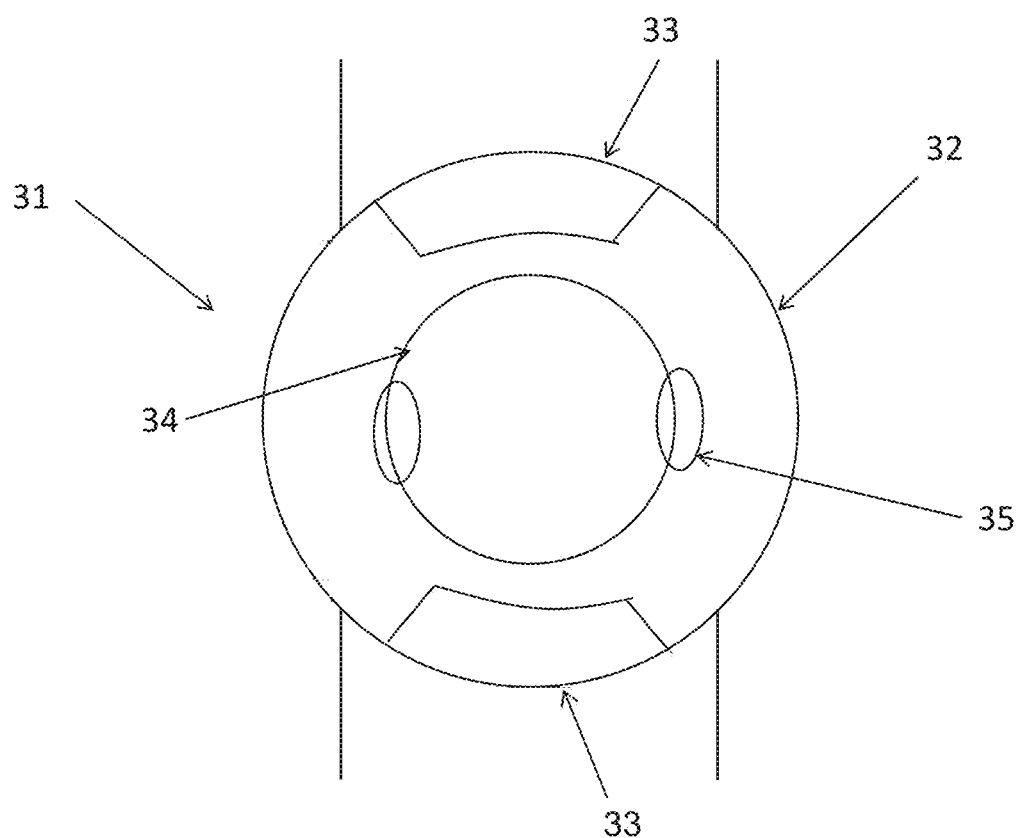
FIG. 4 is a schematic front view of an electrical machine of the gas turbine engine of FIG. 1.

Referring to FIGS. 2 and 4, the electric machine 31 is in the form of a permanent magnet electric machine, and can operate as either a motor or a generator.

The electric machine 31 comprises a stator 32, which is mounted to static structure of the gas turbine engine, for example a core engine casing (not shown). The stator 32 comprises permanent magnets 33, which provide a radial magnetic flux. The electric machine 31 further comprises a rotor 34, which is arranged to rotate in use, and is provided radially inward of the stator permanent magnets 33. The rotor 34 comprises a plurality of electrical windings 35. In use, magnetic flux from the electrical windings 35 and permanent magnets 33 interact to provide torque (when operated as a motor), and electrical current (when operated as a generator).

Figure 5:
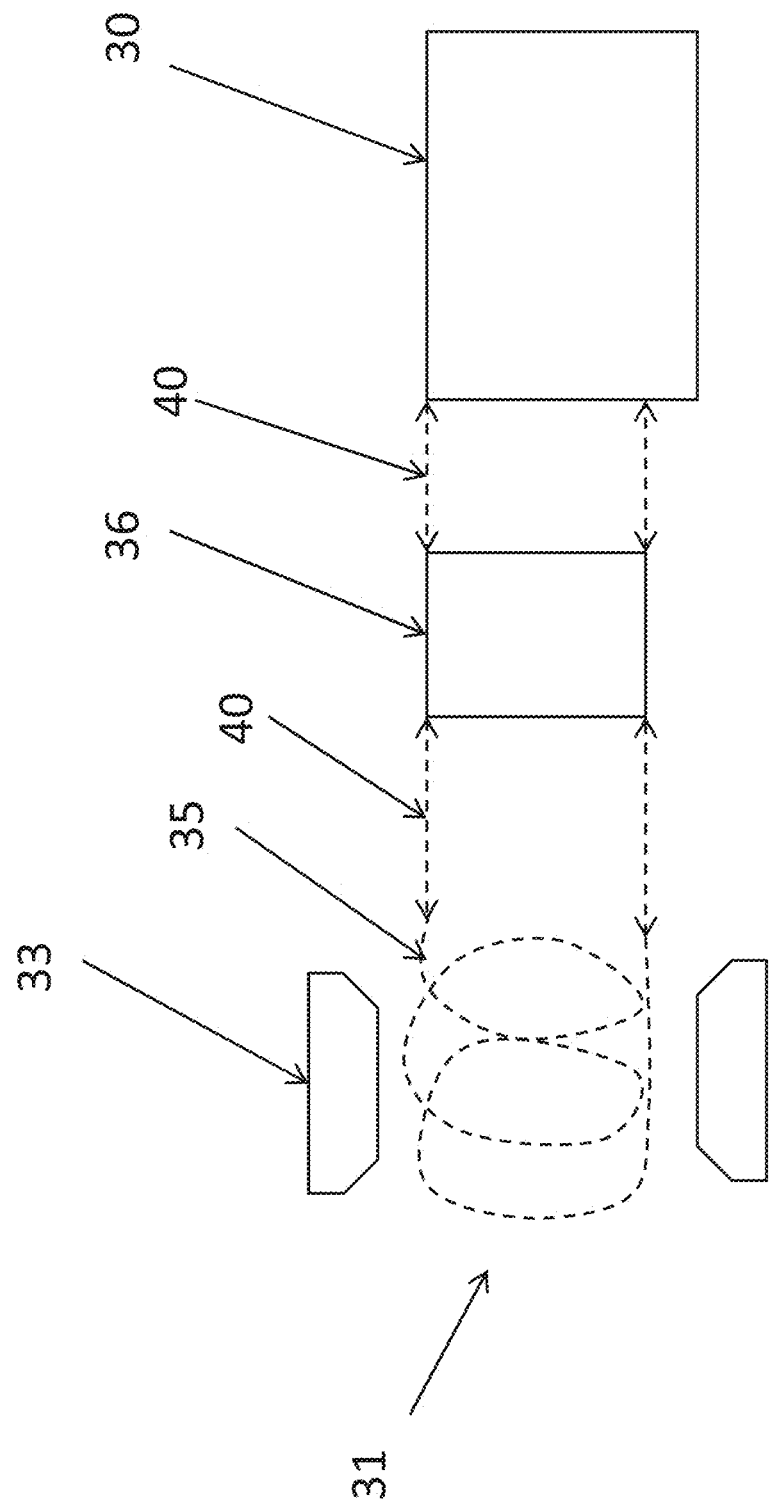
FIG. 5 is a schematic diagram of electrical connections of the gas turbine engine of FIG. 1.

Referring now to FIGS. 2 and 5, the electrical windings 35 of the rotor 34 are electrically coupled to the capacitors 30 by an electrical interconnector 40. In this embodiment, the electrical interconnector is the spool 29, which also acts as a current collector for the capacitors 30. Since both the capacitors 30 and the electric machine rotor 34 are coupled to the compressor shaft 28, they each rotate together in use, and so no slip rings, brushes or rotating transformers are required. A power electronics device such as an inverter/rectifier 36 is provided electrically in series between the rotor windings 35 and the capacitors 30, to convert the AC current generated/required by the rotor windings 35, to the DC current stored by the capacitors 30. The power electronics device may also include a voltage controller, to increase or reduce the voltage supplied to or delivered from the capacitors 30.

Advantageously, the electric motor 31 can be powered by the capacitors 30, to generate electrical power during deceleration and/or periods of excess engine power, and to boost the compressor 14 during periods of acceleration and periods of low power. By using a capacitor, high power can be provided for relatively short term transients, since total energy requirements for this type of operation may be relatively low. Alternatively, the power generated by the electric motor 31 could be used for other purposes. For example, the gas turbine engine 10 includes an offtake drive shaft 37, which is coupled to the compressor shaft 28 by an offtake drive. The offtake drive shaft 28 is in turn coupled to an output load 42, such as engine fuel or oil pumps, environmental control system compressors, further electrical generators, or other such loads. By providing an electric machine 31 coupled to the compressor shaft 28, with power being provided/stored by compressor drum 23 mounted capacitors, transient additional loads by the loads can be accommodated, without overburdening the compressor 14.

For instance, the gas turbine engine could be operated as follows. Prior to take-off, the capacitors 30 are fully charged. During acceleration for the take-off run, energy from the capacitors 30 are used to increase compressor 14 speed (N2) by operating the electric machine 31 as a motor, to boost core flow, to enable high power. Consequently, higher power can be provided for take-off, and a smaller core size can be used. This can in turn translate into a higher bypass ratio (and so higher propulsive efficiency) and/or a smaller core (and so lower weight). This may offset the additional weight of the electric machine and capacitors 30. Such operation can also effectively allow for variable bypass ratios, since core low can be increased relative to bypass flow. Consequently, the engine can allow for different bypass ratios during different parts of the flight, thereby allowing further flexibility, and further optimisation for different parts of the flight.

Once the take-off run is completed, the capacitors 30 are charged by the electric machine 31 operating as a generator. In flight, the capacitors 30 are kept charged, and the electric machine 31 is used as a motor intermittently as required to boost the compressor 14, when it is detected that the compressor 14 is approaching surge or stall. Consequently, the compressor 14 can be designed to operate closer to stall, thereby enabling one or both of a higher compression ratio (and so high engine thermal efficiency), and a reduced number of compressor stages for the same compression ratio (and so reduced weight).

During descent, or at operation of the compressor 14 at low power, power can be transferred from the capacitor 30 to boost the compressor shaft 28. This can alleviate stress on the compressor 14 during lower power conditions, when power offtake from the offtake shaft 37 represents a relatively high proportion of compressor shaft load. Consequently, the engine 10 can be operated at a lower flight idle, thereby saving fuel, and allowing for steeper descent.

Similar methods of operation are also possible where the electrical storage device comprises a chemical battery. However, where the electrical storage device comprises a fuel cell, these cannot generally be charged electrically, and so the amount of energy available is fixed at the beginning of the flight. On the other hand, fuel cells can be rapidly filled with fuel between flights, resulting in faster turnaround times. Furthermore, fuel cells typically have higher power densities and energy densities that conventional chemical batteries, and significantly higher energy densities than capacitors.

Consequently, a low weight, integrated system is provided for improving compressor 14 operability, which has high reliability and high power.

Figure 6:
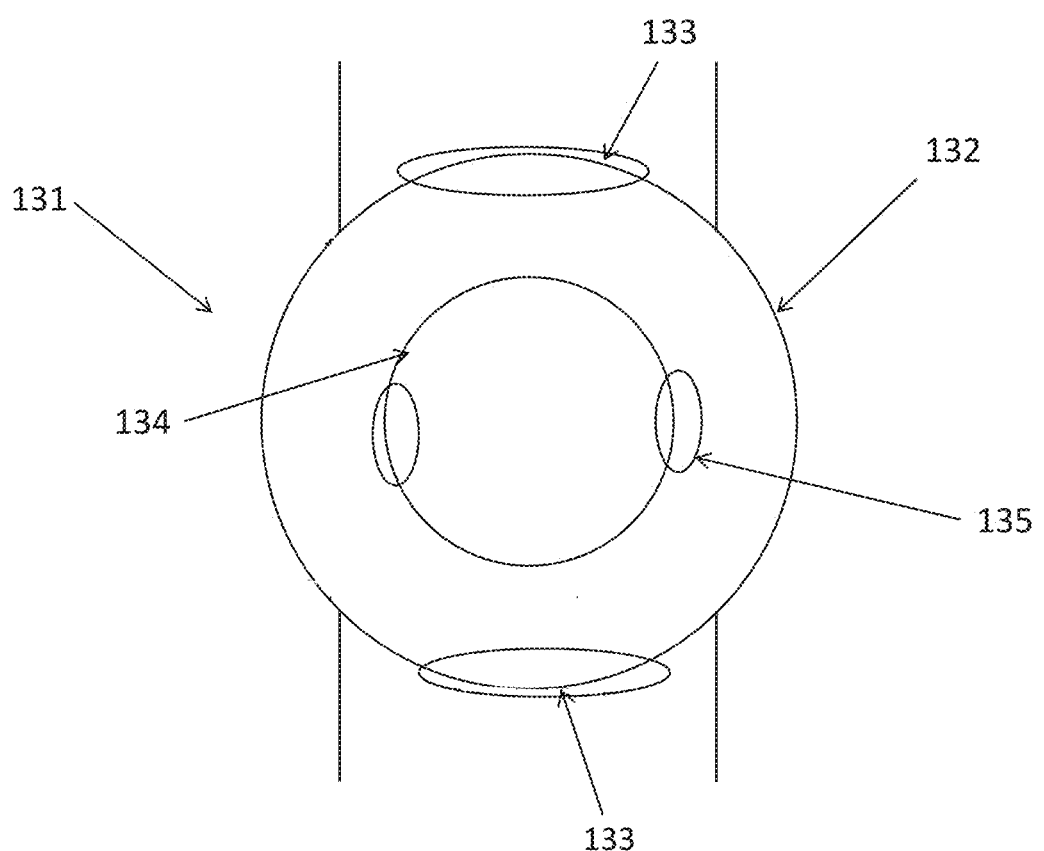
FIG. 6 is a schematic front view of an alternative electrical machine for the gas turbine engine of FIG. 1.

FIG. 6 shows an alternative electric machine 131 suitable for use with the gas turbine engine 10. The electric machine 131 is a synchronous electric machine comprising a stator 132 having stator magnets 133. However, the stator magnets are in the form of electromagnets, formed by electrically excited windings 133. In use, when acting as a motor, the windings 133 are provided with AC current, which interacts with AC or DC current fed to windings 135 of a rotor 134, which is similar to the rotor 34. Again, the rotor windings 135 are electrically coupled to the capacitor 30. Again, where AC current is required, an inverter (not shown) will be required between the capacitor 30 and windings 131. However, optionally, the inverter can be omitted, with the windings 131 being provided with DC current, thereby reducing the amount of power electronics required. The magnetic fields interact to produce a torque to rotate the motor 131, which is again coupled to the compressor 14. Similarly, the electric machine 131 can act as a generator, with a fluctuating magnetic field generated by the stator windings 133 generating an electric current in the rotor windings. Consequently, the electric machine 131 can similarly act as either a motor or a generator, to boost the compressor 14, or to charge the capacitor 30 from electricity generated by the electric machine 131.

Figure 7:
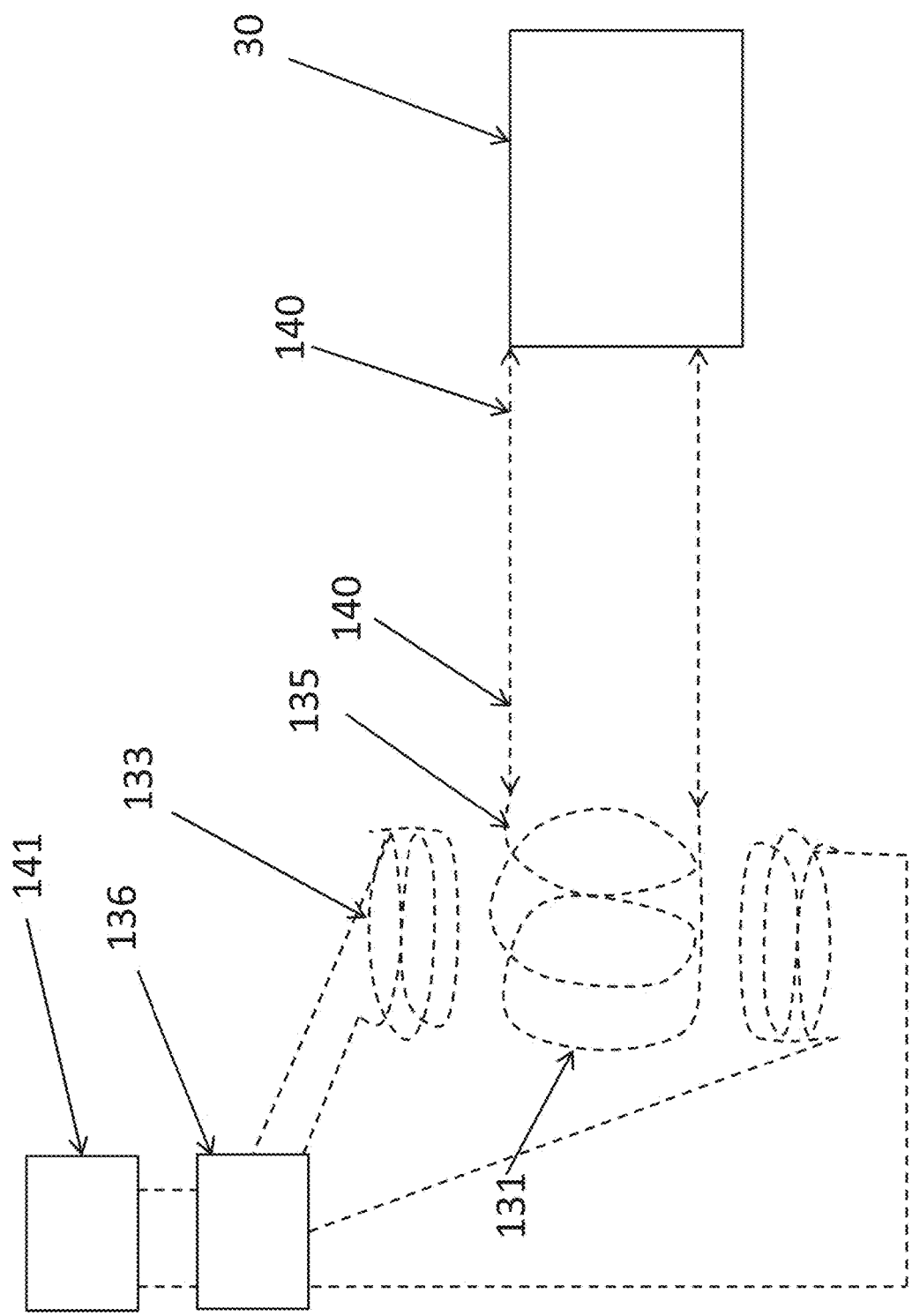
FIG. 7 is a schematic diagram of electrical connections of the gas turbine engine of FIG. 1 when used with the electric machine of FIG. 6.

Electrical connections of the electric machine 131 are shown in FIG. 7. Similar to the electric machine 31, with the electric machine 131, rotor windings 135 are electrically coupled to the capacitors 30 by an electrical interconnector 140. As can be seen, the stator windings 133 are coupled to an additional power source, such as a separate generator or battery 141. Where a DC power source such as a battery 141 is provided, power electronics 136 in the form of an inverter is required, to convert the DC current to AC current. The stator windings 133 are also optionally coupled to one or more electrical loads, such as fuel pumps, flight surface actuators etc. Consequently, the electric machine 131 can be used to power more than just the capacitor 30 and electric machine 131 when acting as a motor, and can be used as a generator for general purposes.

Advantageously, greater control can be provided over the electric machine 131 relative to the permanent magnet machine 31, as the electric machine 131 contains no permanent magnets, and so can be turned off when desired. In this case, the capacitors 30 only have to generate a fraction of the electrical current required by the electric machine, and so their storage capacity can be smaller for a given amount of generator power. Consequently, the relative small storage capacity of the capacitors 30 can nevertheless provide for a relatively large duration of operation of the motor 31. Furthermore, power electronics (i.e. an inverter) will not be required when the electric machine 131 is operated as a motor, since DC current can be supplied to the rotor windings. On the other hand, a rectifier will still generally be required in series between the rotor windings 135 and capacitors 30, to convert AC current generated by the rotor windings 135 to DC current when the electric machine 131 is operated as a generator.

Furthermore, it has been found to be difficult to integrate electrical machines within the cores of gas turbines, in view of the high temperatures found therein. Integrated permanent magnet electric machines have previously been considered. However, the temperatures within gas turbine cores are relatively high, and so in some cases, de-magnetisation may occur during some operating conditions, leading to deterioration of the electric machine. Furthermore, permanent magnet electrical machines always produce electrical power when rotating, which makes turning them off difficult. Conventional solutions such as clutches add weight, and reduce reliability. Consequently, in this embodiment, an electric machine comprising a wound field rotor and wound field stator is provided. Consequently, demagnetisation is no longer a problem (as permanent magnets are not required), and so the machine can operate at higher temperatures. Furthermore, such machines can be turned off, by cutting off electrical current to the rotor. However, conventionally, such machines require a method for providing current to the rotor coils. Conventionally, this would include either a separate generator provided on the same shaft as the main generator, a rotating transformer, or brushes. In the present disclosure, an electric storage device is provided, which rotates with the rotor, and which is charged by the electric machine acting as a generator. Consequently, these separate generators, transformers and bushes can be omitted, greatly reducing the weight of the system. Finally, where a permanent magnet electrical machine is provided, the permanent magnets can be provided radially outward of the wound rotor, where cooling air is available. Consequently, the permanent magnets can operate in a cooler environment, thereby preventing demagnetisation.

The electric machine 131 could also be operated as a rotating transformer, providing high current and/or high voltage supplied by the capacitor 30 to the stator windings 133, by, for instance, supplying high current DC electricity to the rotor windings 135, which is then transferred to the stator windings 133 electromagnetically. The current and voltage within the stator windings 133 would then be dependent on the relative number of turns in the rotor windings 135 and stator windings 133, and the current and input voltage on the rotor windings 133.

Figure 8:
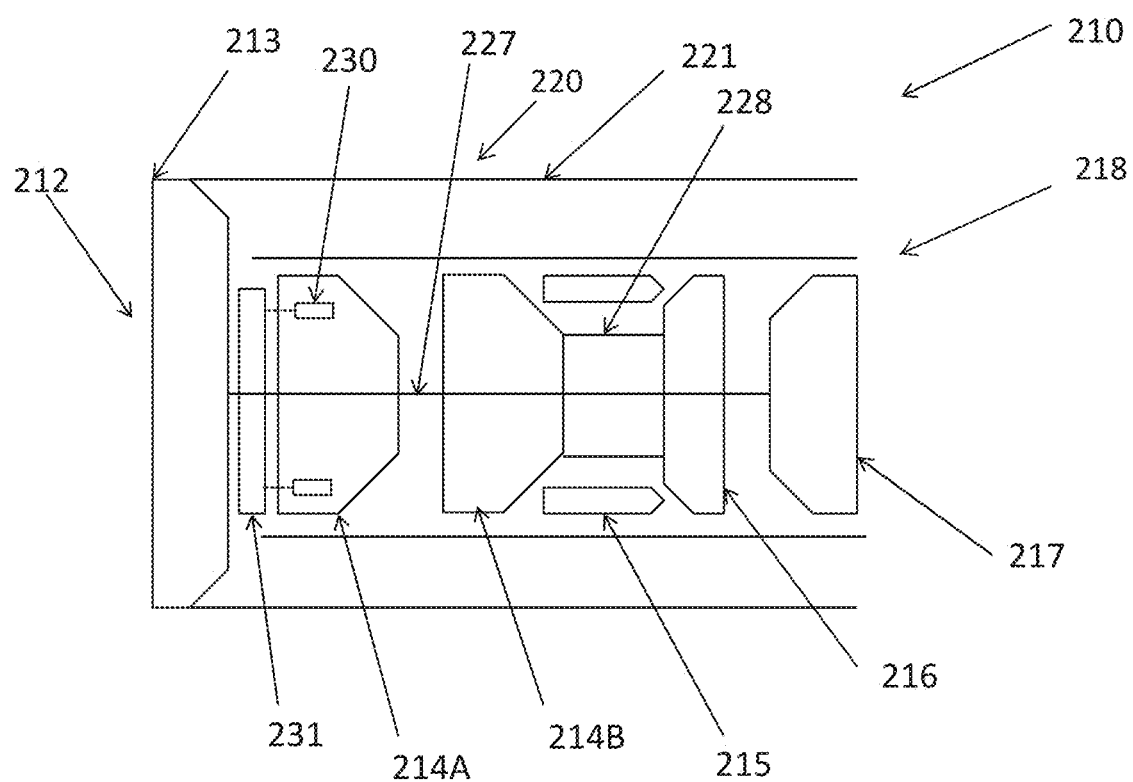
FIG. 8 is a sectional side view of a second gas turbine engine.

FIG. 8 shows a second gas turbine engine 210. The second gas turbine engine 210 is similar to the gas turbine engine 10 of FIGS. 1 to 6, but has a different arrangement of shafts, compressors and turbines.

The gas turbine engine 210 comprises in axial flow series, an air intake 212, a propulsive fan 213, a low pressure compressor 214a, a high pressure compressor 214b, combustion equipment 215, a high-pressure turbine 216, a low-pressure turbine 217 and an exhaust nozzle 218. A nacelle 220 generally surrounds the engine 10 and defines the intake 212.

The gas turbine engine 210 works in a similar manner to the engine 10, so that air entering the intake 212 is accelerated by the fan 213 to produce two air flows: a first air flow into the compressors 214a, 214b and a second air flow which passes through a bypass duct 221 to provide propulsive thrust. The compressors 214a, 214b compress the air flow in series before delivering that air to the combustion equipment 215.

In the combustion equipment 215 the air flow is mixed with fuel and the mixture combusted. The resultant hot combustion products then expand through, and thereby drive the high and low-pressure turbines 216, 217 before being exhausted through the nozzle 218 to provide additional propulsive thrust.

The high 216 pressure turbine drives the high pressure compressor 214b by a high pressure shaft 228. The low pressure turbine 217 drives both the low pressure compressor 214a and the fan 213, by a fan shaft 227.

The gas turbine engine 210 further comprises an electric storage device 230, which is similar to the electric storage device 30 of the gas turbine engine 10, and again may comprise any of a capacitor, chemical battery and fuel cell. The capacitor is mounted to a compressor drum of the compressor 214a, in a similar manner to the capacitor 30 of the gas turbine engine 10. The storage device is 230 electrically coupled to an electric machine 231, which is similar to either the electric machine 31 or the electric machine 131.

In this embodiment however, the electric machine 231 is coupled to both the low pressure compressor 214a and the fan 213. Consequently, the electric machine 231 can be used to boost engine thrust in use, by increasing fan 213 rotational speed, and can also be used to recover kinetic energy from the aircraft, by operating as a generator, with the electric machine being driven by the fan 213 acting as a windmill. Consequently, in this embodiment, even steeper descents can be made, and further increased thrust can be provided.

Furthermore, additional thrust can be generated, whilst only driving part of the engine core, thereby allowing thrust increase, with a reduced energy requirement compared to the gas turbine engine 10.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan. It will be understood that the invention is not limited to the embodiments above-described and various modifications and improvements can be made without departing from the concepts described herein. For instance, the gas turbine engine may comprise first and second compressors and a fan, each mounted on a separate shaft. Except where mutually exclusive, any of the features may be employed separately or in combination with any other features and the disclosure extends to and includes all combinations and sub-combinations of one or more features described herein.

The invention claimed is:

1. A gas turbine engine comprising:
a compressor, the compressor comprising a plurality of blades mounted to a hollow, annular compressor drum,
wherein the compressor comprises one or more electric storage devices mounted within the hollow compressor drum,
wherein the compressor comprises two or more compressor discs joined by a rim provided at a root of the compressor blades, to form the compressor drum, each compressor disc comprising a web extending radially inwardly from the rim, and
wherein the one or more electric storage devices are provided in a space defined by adjacent webs and the rim.

2. The gas turbine engine according to claim 1, wherein the one or more electric storage devices comprises one or more of a chemical battery, a fuel cell, and a capacitor.

3. The gas turbine engine according to claim 1, wherein the one or more electric storage devices are provided in a toroidal space defined by the adjacent webs and the rim.

4. The gas turbine engine according to claim 1, wherein the compressor comprises a radially inner spool spaced from the rim.

5. The gas turbine engine according to claim 4, wherein the one or more electric storage devices is mounted to the radially inner spool.

6. The gas turbine engine according to claim 5, wherein the electric storage device comprises a capacitor, and the capacitor is wound around the radially inner spool.

7. The gas turbine engine according to claim 1, wherein the gas turbine engine comprises an electric machine coupled to the compressor of the gas turbine engine.

8. The gas turbine engine according to claim 7, wherein the electric machine is electrically coupled to the one or more electric storage devices.

9. The gas turbine engine according to claim 7, wherein the electric machine comprises a synchronous electric machine comprising a stator having a plurality of stator windings, and a rotor comprising a plurality of rotor windings.

10. The gas turbine engine according to claim 9, wherein the rotor windings are electrically coupled to the one or more electric storage devices.

11. The gas turbine engine according to claim 7, wherein the electric machine comprises a permanent magnet electrical machine, comprising a plurality of permanent magnets mounted to one of a stator and a rotor, with the other of the rotor and the stator comprising a plurality of electrical windings.

12. The gas turbine engine according to claim 11, wherein the electrical windings are mounted to the rotor, the gas turbine engine comprises one or more power electronics units configured to convert between AC current generated/required by the rotor windings and DC current provided/required by the one or more electric storage devices.

13. The gas turbine engine according to claim 7, wherein the gas turbine engine comprises a fan located forward of the compressor.

14. The gas turbine engine according to claim 13, wherein the electric machine is mounted between the fan and the compressor, and is configured to drive the fan, and may be configured to be driven by the fan.

15. A gas turbine engine comprising:
a compressor, the compressor comprising a plurality of blades mounted to a hollow, annular compressor drum,
wherein the compressor comprises one or more electric storage devices mounted within the hollow compressor drum,
wherein the gas turbine engine comprises an electric machine coupled to the compressor of the gas turbine engine, the electric machine comprising a permanent magnet electrical machine, comprising a plurality of permanent magnets mounted to one of a stator and a rotor, with the other of the rotor and the stator comprising a plurality of electrical windings, and
wherein the electrical windings are mounted to the rotor.

16. The gas turbine engine according to claim 15, further comprising one or more power electronics units configured to convert between AC current generated/required by the plurality of electrical rotor windings and DC current provided/required by the one or more electric storage devices.

17. A gas turbine engine comprising:
a compressor, the compressor comprising a plurality of blades mounted to a hollow, annular compressor drum,
wherein the compressor comprises one or more capacitors mounted within the hollow compressor drum,
wherein the compressor comprises two or more compressor discs joined by a rim provided at a root of the compressor blades, to form the compressor drum, each compressor disc comprising a web extending radially inwardly from the rim, and
wherein the one or more capacitors are provided in a space defined by adjacent webs and the rim.

18. The gas turbine engine according to claim 17, wherein the one or more capacitors are provided in a toroidal space defined by the adjacent webs and the rim.

19. The gas turbine engine according to claim 17, wherein the one or more capacitors are wound around a radially inner spool spaced from the compressor rim.

* * * * *

UNITED STATES PATENT AND TRADEMARK OFFICE
CERTIFICATE OF CORRECTION

PATENT NO. : 11,073,109 B2  
APPLICATION NO. : 16/569987  
DATED : July 27, 2021  
INVENTOR(S) : Stuart Moss and Douglas M M Herbert It is certified that error appears in the above-identified patent and that said Letters Patent is hereby corrected as shown below:

In the Claims

Column 10, Claim 16, Line 7, delete "rotor"

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*